United States Patent
Izumo et al.

(10) Patent No.: US 8,513,545 B2
(45) Date of Patent: Aug. 20, 2013

(54) BUILT-IN WEIGHT LIFTING AND LOWERING DEVICE

(75) Inventors: Naoto Izumo, Kitamoto (JP); Akiyoshi Oota, Kitamoto (JP)

(73) Assignee: A&D Company, Ltd., Tokyo (JP)

( * ) Notice: Subject to any disclaimer, the term of this patent is extended or adjusted under 35 U.S.C. 154(b) by 461 days.

(21) Appl. No.: 12/666,577

(22) PCT Filed: Jul. 24, 2007

(86) PCT No.: PCT/JP2007/064505
§ 371 (c)(1),
(2), (4) Date: Dec. 23, 2009

(87) PCT Pub. No.: WO2009/013812
PCT Pub. Date: Jan. 29, 2009

(65) Prior Publication Data
US 2010/0181118 A1    Jul. 22, 2010

(51) Int. Cl.
*G01G 23/01*    (2006.01)

(52) U.S. Cl.
USPC ............................................. 177/50; 73/1.13

(58) Field of Classification Search
USPC ......................... 177/50, 146; 73/1.13, 1.15
See application file for complete search history.

(56) References Cited

U.S. PATENT DOCUMENTS

| | | | | |
|---|---|---|---|---|
| RE27,234 E | * | 11/1971 | Smieja | 177/146 |
| 4,156,361 A | * | 5/1979 | Melcher et al. | 73/1.13 |
| 4,343,373 A | * | 8/1982 | Stadler et al. | 177/50 |
| 4,425,975 A | * | 1/1984 | Luchinger | 177/50 |
| 4,589,507 A | * | 5/1986 | Curran | 177/138 |
| 4,673,048 A | * | 6/1987 | Curran | 177/146 |
| 4,766,965 A | | 8/1988 | Luchinger | |
| 4,932,486 A | * | 6/1990 | Komoto et al. | 177/50 |
| 4,932,487 A | * | 6/1990 | Melcher et al. | 177/50 |
| 5,148,881 A | | 9/1992 | Leisinger | |
| 5,550,328 A | * | 8/1996 | Freeman et al. | 177/50 |
| 6,194,672 B1 | * | 2/2001 | Burkhard et al. | 177/210 EM |
| 6,923,449 B2 | * | 8/2005 | Burkhard et al. | 277/412 |
| 7,012,198 B2 | | 3/2006 | Luedi et al. | |
| 7,176,389 B2 | * | 2/2007 | Iiduka | 177/50 |
| 2010/0181118 A1 | * | 7/2010 | Izumo et al. | 177/50 |

FOREIGN PATENT DOCUMENTS

| | | |
|---|---|---|
| JP | 7-139992 | 6/1995 |
| JP | 11-160141 | 6/1999 |
| JP | 2000-097756 | 4/2000 |
| JP | 2000-121423 | 4/2000 |
| JP | 2001-153749 | 6/2001 |
| JP | 2001-221682 | 8/2001 |

* cited by examiner

*Primary Examiner* — Randy W Gibson
(74) *Attorney, Agent, or Firm* — Jordan and Hamburg LLP

(57) ABSTRACT

A device that adds and removes a load of a built-in weight to and from a load measuring mechanism of a weighing apparatus built-in weight latched in a weight holder that performs a lifting and lowering operation to a fixed portion. During calibration, gas is supplied from a gas supply and exhaust portion to a bag to increase volume of the air bag. At this point, the weight holder is lowered against the repulsive force of a coil spring, and the built-in weight is latched in the load receiver, thereby performing the calibration. After the calibration, an electromagnetic valve is opened to exhaust the gas from the bag. As a result, the weight holder is lifted by the repulsive force of the coil spring, and the weighing apparatus enters a usual weighing mode.

7 Claims, 4 Drawing Sheets

FIG. 5
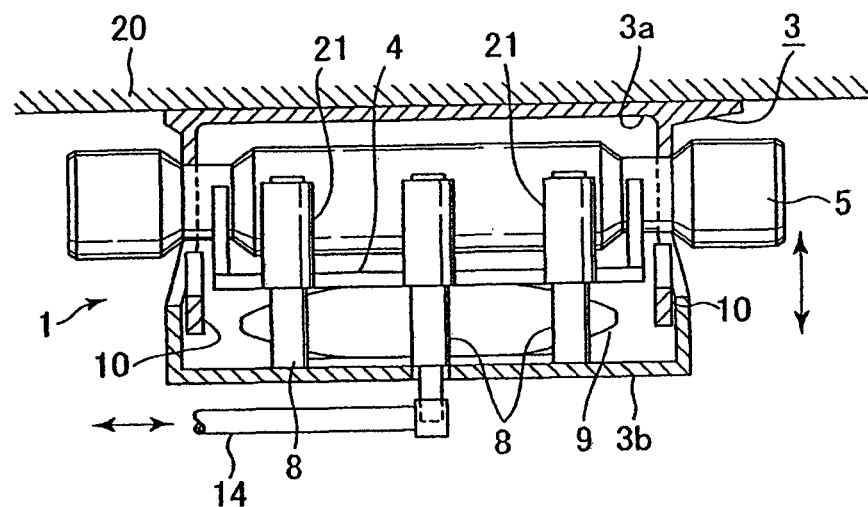
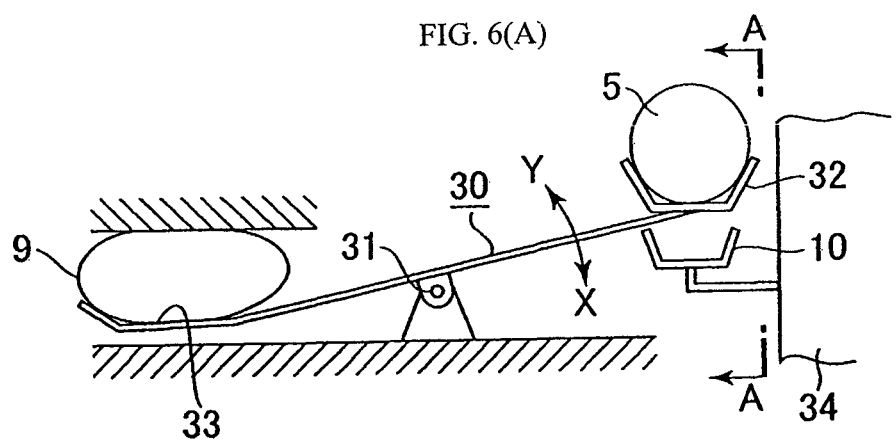
FIG. 6(A)
FIG. 6(B)
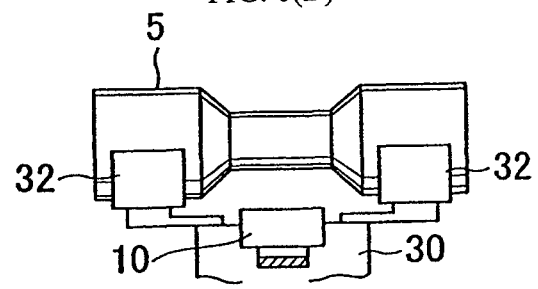

BUILT-IN WEIGHT LIFTING AND LOWERING DEVICE

BACKGROUND OF THE INVENTION

The present invention relates to a device in which a load measuring mechanism of a weighing apparatus has a load of a weight incorporated in a weighing apparatus or the load measuring mechanism has no load of the weight by supporting the load of the weight, and particularly to a device that is suitably applied to the weighing apparatus collectively called an electronic scale.

Because the electronic scale such as an electromagnetic balancing type scale has high performance and high resolution, the electronic scale tends to heavily depend on an environment in which the electronic scale is placed as the weighing apparatus.

For example, a change in weighing value of the electronic scale is generated by a slight change in physical property, such as a latitude on a map of placement site, a temperature of a placement environment, a change in atmospheric pressure or attraction of the moon caused by movement of the moon, and a change in gravitational field caused by ground characteristics, which can substantially be ignored in the usual life environment. As to a gravitational acceleration distribution, it is known that the gravitational acceleration distribution has a difference of about $1/1000$ in Japan.

Therefore, in high-end models such as high-performance electromagnetic balancing type weighing apparatus called an analytical balance having resolution exceeding $1/10^6$ and models called a general-purpose balance having resolution of about $1/10^5$, a weight for calibration is almost always incorporated therein, the calibration is performed by the weighing apparatus, and the proper measurement can always be made even if the change in physical property is generated in the placement environment.

FIG. 8 conceptually illustrates a method of performing the calibration using the built-in weight in the electromagnetic balancing type weighing apparatus. In the weighing apparatus, a weight W of a measured sample loaded on a pan 50 is transmitted to an electromagnetic portion 53 through a beam 52 guided by a Roverbal mechanism including upper and lower sub-beams 51a and 51b, an electric amount is supplied to the electromagnetic portion 53 so as to be balanced with an amount of displacement of the electromagnetic portion 53, and the weight W of the sample is measured based on the electric amount.

As described above, because the weighing value is possibly changed by the change of the placement environment in the electromagnetic balancing type weighing apparatus, periodically or appropriately by switch manipulation of a user, a built-in weight 54 with a precisely determined mass is loaded on a built-in weight load receiver portion 55 of a load measuring mechanism to perform the calibration of the weighing apparatus such that the weighing value of the built-in weight is matched with a mass of the built-in weight.

The weighing apparatus having the built-in weight has a mechanism that loads the built-in weight on the load measuring mechanism or pulls up the loaded built-in weight to bring the load measuring mechanism into a no-load state (hereinafter the operations are referred to as "addition and removal" of the built-in weight). Therefore, the appropriate calibration is automatically and periodically performed using a timer or by switch manipulation of the weighing apparatus user. Patent Documents listed below disclose a built-in weight addition and removal (lifting and lowering) mechanism that adds and removes the built-in weight in performing the calibration.

Patent Document 1: Japanese Patent Application Laid-Open No. 2001-221682
Patent Document 2: Japanese Patent Application Laid-Open No. 11-160141
Patent Document 3: Japanese Patent Application Laid-Open No. 2000-097756
Patent Document 4: Japanese Patent Application Laid-Open No. 2000-121423
Patent Document 5: Japanese Utility Model Registration No. 2506662
Patent Document 6: U.S. Pat. No. 7,012,198
Patent Document 7: U.S. Pat. No. 5,148,881
Patent Document 8: U.S. Pat. No. 4,766,965

SUMMARY OF THE INVENTION

In all of the above Patent Documents, in the addition and removal of the built-in weight to and from the load measuring mechanism, the built-in weight load is lifted and lowered with respect to the built-in weight load receiver of the measuring mechanism, whereby the built-in weight is loaded in the lowering and the no-load state is realized in the lifting.

In the mechanisms disclosed in the Patent Documents, in order to realize the operation, rotation motion of a motor is converted into linear motion through a cam, or a moving member performs the linear motion by a rotating screw to lift and lower the built-in weight.

In configurations of the Patent Documents, a member that performs the rotation motion and a member that converts the rotation motion into the linear motion are required in the operation for lifting and lowering the built-in weight. Therefore, a contact and sliding operation between the members is required. Unfortunately temporal abrasion of a component is generated in the contact and sliding operation, a frictional resistance is increased by the abrasion, heat generation in the motor is caused by increasing a load on the motor due to the increased frictional resistance, and a motor gear portion or a driving mechanism is broken down. A malfunction is relatively frequently generated in the weighing apparatus. Therefore, it is necessary to check and adjust the weighing apparatus in a relatively short period.

The power transmission system is complicated to increase the number of components, and therefore the weighing apparatus is inevitably enlarged and complicated. Recently there is a strong demand for miniaturization and low-profile of the weighing apparatus, and the conventional built-in weight adding and removing mechanism hardly deals with the demand.

The invention has been made in view of such circumstances.

In the mechanism disclosed in the Patent Documents, the built-in weight is lifted and lowered by the linear motion of the moving member by the rotating screw or by a series of operations performed by the cam and the member that performs the linear motion according to the rotation of the cam. On the other hand, a built-in weight lifting and lowering device according to an aspect of the invention is characterized in that a volume variable container typified by an air bag is used as a driving body that performs the built-in weight lifting and lowering operation, and a built-in weight is directly lifted and lowered by a change in volume of the driving body corresponding to a change in volume of the volume variable driving body, or the built-in weight is indirectly lifted and lowered using a simple conversion mechanism such as a lever.

In the built-in weight lifting and lowering device according to the aspect of the invention, because the rotating cam and the member that comes into contact with and is slid on the cam are eliminated, advantageously the temporal abrasion of the component is not generated in the contact and sliding operation, the frictional resistance is not increased by the abrasion, the heat generation in the motor is not caused by increasing the load on the motor due to the increased frictional resistance, and the breakdown of the motor gear portion or the driving mechanism is not generated. Accordingly, the high-reliability weighing apparatus can be used in an almost maintenance-free state.

Formerly a user of the weighing apparatus having the built-in weight is restricted to a public research laboratory and an institute of a company or university, and the user has a relatively high expert knowledge of the weighing apparatus. Recently, however, frequently the built-in weight is mounted on the general-purpose balance placed on a production line and the weighing apparatus used in the educational site in which the relatively low-cost weighing apparatus is demanded. The reliability improvement of the mechanism becomes important particularly in the production line where the weighing apparatus is frequently used, and the advantages of the built-in weight lifting and lowering device according to the aspect of the invention are required to achieve the wide spread use of the electronic scale in the near future.

More particularly, in the conventional devices disclosed in the Patent Documents, frequently a geared motor is used as the driving device. In the small-size motor, input energy density is decreased and a torque is not enough to drive the built-in weight lifting and lowering mechanism during low-speed rotation. Therefore, the expensive geared motor in which a planet gear susceptible to breakage is applied is used as the driving device, the motor is rotated at high speed, and the number of revolutions is degreased by the gear to increase the torque. On the other hand, in the built-in weight lifting and lowering device according to the aspect of the invention, the volume variable driving body having the extremely simple structure is used, and the expensive component such as the geared motor whose failure occurrence rate is relatively high is not eliminated, so that the mechanism can be produced at low cost while the reliability thereof is improved.

BRIEF DESCRIPTION OF THE DRAWINGS

FIG. 5 is a longitudinal sectional view illustrating a built-in weight lifting and lowering device according to a second embodiment of the invention.

FIG. 6 illustrates a built-in weight lifting and lowering device according to a third embodiment of the invention, wherein FIG. 6(A) is a side view illustrating the built-in weight lifting and lowering mechanism in which a lever mechanism is used, and FIG. 6(B) is a view from a line A-A of FIG. 6(A).

DETAILED DESCRIPTION OF THE INVENTION

An elastic body that is biased in a holder lifting direction with respect to the weight holder that directly lifts and lowers the built-in weight, and an air bag that is disposed in a space between a weight holder and a fixed member to be able to change a volume are disposed, the air bag is connected to air supply and exhaust means, the weight holder is lowered against the repulsive force of the elastic body by increasing the volume of the air bag, and a load measuring mechanism has a load of the built-in weight. The volume of the air bag is reduced by emitting the air of the air bag. Therefore, the repulsive force of the elastic body is restored, the weight holder is lifted by the repulsive force, the load measuring mechanism side has no load of the built-in weight, and the no-load state is maintained, whereby normal measurement work can be performed in the weighing apparatus.

Exemplary embodiments of the invention will be described below with reference to the drawings.

Figure 1:
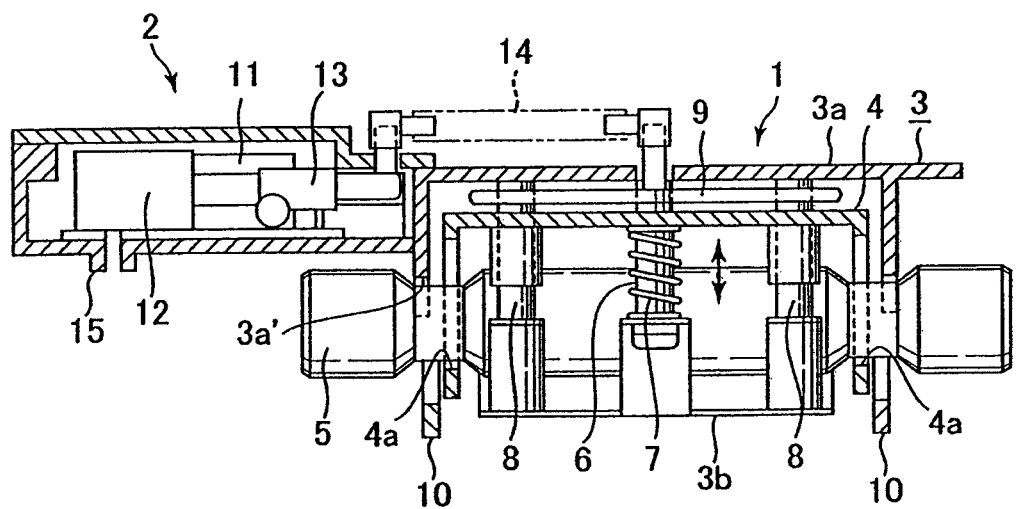
FIG. 1 is a longitudinal sectional view illustrating a built-in weight lifting and lowering device according to a first embodiment of the invention, and is a sectional view taken on a line I-I of FIG. 2.
Figure 2:
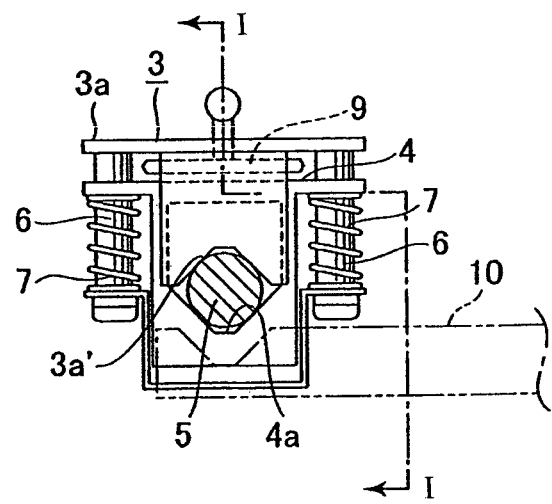
FIG. 2 is a sectional view illustrating the built-in weight lifting and lowering device as viewed from a direction orthogonal to a shaft center of a built-in weight.

FIGS. 1 to 4 illustrate a built-in weight lifting and lowering device according to a first embodiment of the invention, and illustrate a direct lifting and lowering type mechanism in which a built-in weight is directly lifted and lowered by an air bag. FIGS. 1 and 2 illustrate a state in which the built-in weight is lifted in the built-in weight lifting and lowering device of the first embodiment, that is, a state in which a load measuring mechanism of a weighing apparatus has no load of the built-in weight.

The built-in weight lifting and lowering device of the first embodiment includes a built-in weight lifting and lowering mechanism portion 1 and an air supply and exhaust portion 2. The built-in weight lifting and lowering mechanism portion 1 directly lifts and lowers the built-in weight. The air supply and exhaust portion 2 supplies air to and exhausts the supplied air from the built-in weight lifting and lowering mechanism portion 1 in order to perform built-in weight lifting and lowering operations.

A configuration of the built-in weight lifting and lowering mechanism portion 1 will be described.

The numeral 3 designates a fixed portion that is a frame of the built-in weight lifting and lowering mechanism portion 1. The built-in weight lifting and lowering device is fixed to a weighing apparatus main body with the fixed portion 3 interposed therebetween, and each member constituting the built-in weight lifting and lowering mechanism portion 1 is directly or indirectly connected to the fixed portion 3. The numeral 3a designates an upper fixed portion, and the numeral 3b designates a lower fixed portion that is connected to the upper fixed portion 3a.

The numeral 4 designates a holder (hereinafter referred to as "weight holder") that holds a built-in weight 5. The weight holder 4 can be lifted and lowered with respect to the fixed portion 3 by the following mechanism.

The numeral 6 designates a pin in which a lower end is fixed onto the side of the lower fixed portion 3b while an upper end is fixed to the upper fixed portion 3a. A coil spring 7 that is an elastic body is provided while the pin 6 is inserted in the coil spring 7. The coil spring 7 is located between the lower end of the pin 6 and a lower surface of the weight holder 4. Therefore, the weight holder 4 is biased toward the side of the upper fixed portion 3a, that is, the lifting direction by a repulsive force of the coil spring 7.

As with the pin 6, in a pin 8, a lower end is fixed onto the side of the lower fixed portion 3b, and an upper end is fixed to the upper fixed portion 3a. However, the coil spring is not provided in the pin 8, and the pin 8 acts as a guide that guides the lifting and lowering operation of the weight holder 4. Based on the function of each pin, hereinafter the pin 6 is referred to as driving pin and the pin 8 is referred to as guide pin. In the configuration of FIGS. 1 and 2, only the center pin acts as the driving pin. Alternatively, when the coil springs are also disposed in the right and left guide pins 8, obviously the guide pins 8 can act as the driving pin.

The numeral 9 designates an airtight container (hereinafter referred to as "air bag") whose volume is varied by the inflow and exhaust of the air. The air bag 9 is disposed in a space between the upper fixed portion 3a and the weight holder 4. In FIGS. 1 and 2, the air in the air bag 9 is exhausted and the air bag 9 has the minimum volume.

The weight holder 4 is located in an uppermost part by the repulsive force of the coil spring 7 when the air bag 9 is in the minimum volume state. At this point, the built-in weight 5 is sandwiched between a latch portion 3a' of the upper fixed portion 3a and a latch portion 4a of the weight holder 4, and the built-in weight 5 is securely fixed in the lifted position. Because the built-in weight 5 is fixed, the built-in weight 5 is not moved even if the weighing apparatus is moved or transported.

Figure 8:
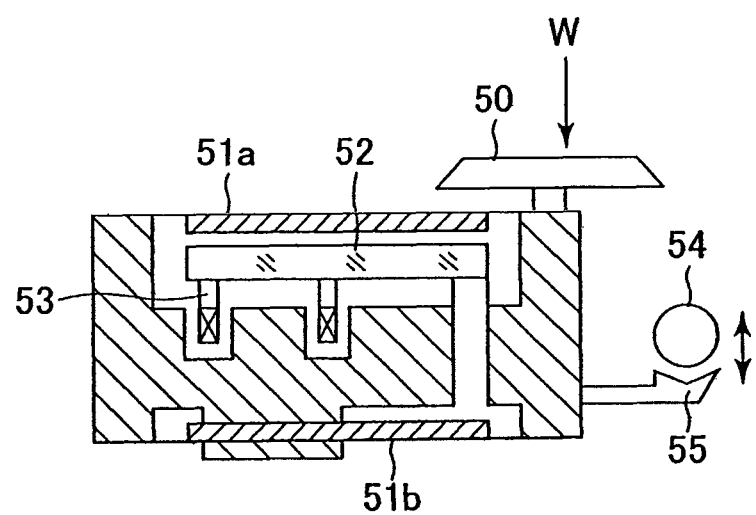
FIG. 8 is a conceptual view illustrating a state in which the built-in weight is added to or removed from an electromagnetic balancing type weighing apparatus.

A load receiver 10 is located in the lower portion of the built-in weight lifting and lowering mechanism 1, and transmits the load of the built-in weight 5 to a load measuring mechanism (not illustrated) of the weighing apparatus. The load receiver 10 corresponds to a built-in weight load receiver portion 55 of FIG. 8.

A configuration of the air supply and exhaust portion 2 will be described.

Figure 3:
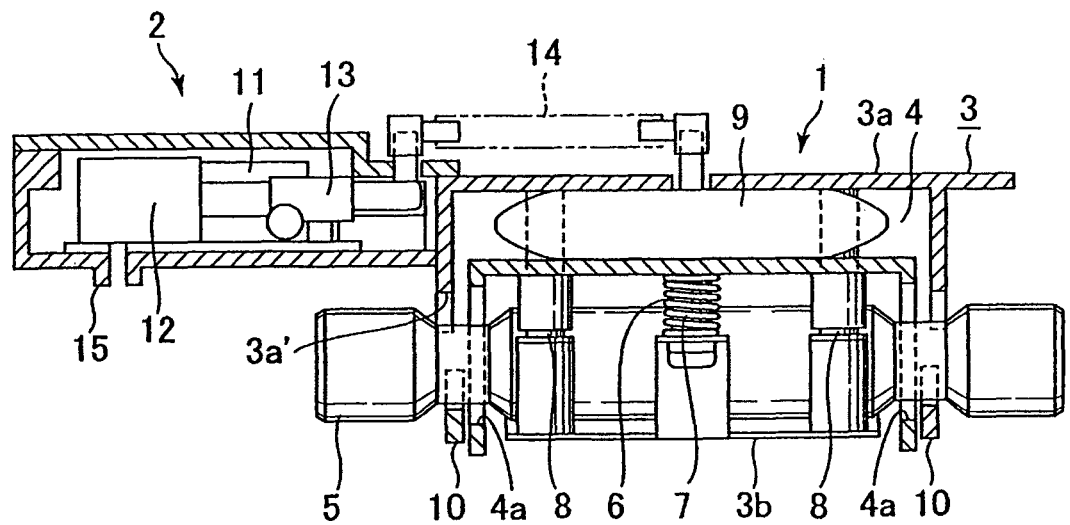
FIG. 3 is a longitudinal sectional view illustrating the built-in weight lifting and lowering device while an air bag volume is maximized.

The numeral 11 designates an air pump in which a pressurizing twin-motor is used as a driving mechanism, the numeral 12 designates an electromagnetic valve that is used to exhaust the air, and the numeral 13 designates an air filter. In the configuration of FIGS. 1 and 3, the air supply and exhaust portion 2 is connected to the built-in weight lifting and lowering mechanism portion 1 to form an integral apparatus as a whole.

An actuating state of the built-in weight lifting and lowering device having the above-described configuration will be described.

When the weighing apparatus on which the built-in weight lifting and lowering device is mounted is in a normal weighing mode, the volume of the air bag 9 becomes minimum as illustrated in FIGS. 1 and 2, and therefore the built-in weight 5 is located in the uppermost part such that the load measuring mechanism of the weighing apparatus has no load of the built-in weight 5.

In cases where the weighing apparatus is calibrated using the built-in weight, the air pump 11 of the air supply and exhaust portion 2 is actuated, and the air discharged from the air pump 11 is supplied to the air bag 9 through the air filter 13 and the air tube 14. The volume of the air bag 9 is gradually increased to thereby lower the weight holder 4 against the repulsive force of the coil spring 7 of the driving pin 6. That is, the air bag 9 is a driving body that lowers the weight holder 4, and the air bag 9 and a later-mentioned container in which another fluid is caused to flow instead of the air are examples of the lowering driving container (hereinafter referred to as "driving container") that imparts the lowering operation to the weight holder 4.

Figure 4:
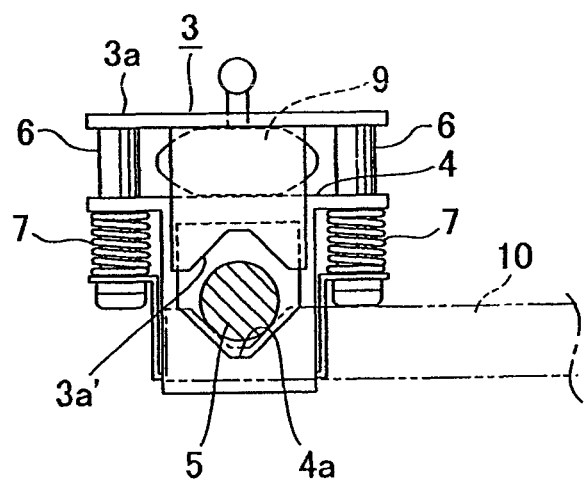
FIG. 4 is a sectional view illustrating the built-in weight lifting and lowering device as viewed from the direction orthogonal to the shaft center of the built-in weight in the state of FIG. 3.

FIGS. 3 and 4 illustrate a state in which the weight holder 4 is lowered to a lowermost part by the increase in volume of the air bag 9.

As illustrated in FIG. 3, the built-in weight 5 supported by the weight holder 4 is latched in the load receiver 10 connected to the load measuring mechanism of the weighing apparatus by lowering the weight holder 4, and the load receiver 10 has the whole load of the built-in weight 5. Therefore, the whole load of the built-in weight 5 is applied onto the load measuring mechanism side to calibrate the weighing apparatus.

When the calibration is completed, the electromagnetic valve 12 of the air supply and exhaust portion 2 is opened to communicate the air bag 9 with ambient air. Accordingly, the repulsive force of the coil spring 7 is restored, the weight holder 4 starts the lifting by the repulsive force, the air in the air bag 9 is emitted to the outside through the air tube 14 and the electromagnetic valve 12 opened to the ambient air, and the built-in weight 5 latched on the side of the load receiver 10 is latched by the weight holder 4 again. Finally the built-in weight 5 is lifted to the uppermost part illustrated in FIGS. 1 and 2 and fixed at that position, thereby returning the weighing apparatus to the normal weighing mode. At this point, the electromagnetic valve 12 is closed to prepare for the next calibrating operation. The numeral 15 designates a vent hole through which the intake air and exhaust air are passed.

Thus, in the built-in weight lifting and lowering device of the first embodiment, the built-in weight can be lifted and lowered by the increase and decrease in volume of the air bag 9 and the repulsive force of the elastic body such as the coil spring, each portion is extremely smoothly actuated due to the absence of a driving conversion mechanism such as a cam and a linear motion member engaged with the cam, and secure operation can be ensured for a long term.

In the configuration of the first embodiment, the air supply and exhaust portion 2 has the integral structure while being connected to the built-in weight lifting and lowering mechanism portion 1. In short, the above-described function can be exerted as long as the air supply and exhaust portion 2 and the built-in weight lifting and lowering mechanism portion 1 are connected by air supply means such as the air tube 14.

Accordingly, the air supply and exhaust portion 2 may be formed independently of the built-in weight lifting and lowering mechanism portion 1, and the air supply and exhaust portion 2 may be disposed in another part of the weighing apparatus or outside the weighing apparatus main body.

FIG. 5 illustrates a built-in weight lifting and lowering device according to a second embodiment of the invention.

In the second embodiment, the built-in weight lowering operation is realized by free fall of a self weight of the built-in weight.

In the configuration of FIG. 5, the fixed portion 3 constituting the main body of the lifting and lowering mechanism portion 1 is fixed to an upper casing 20 of the weighing instrument main body, and the whole of the lifting and lowering mechanism portion 1 is hung and supported by the upper casing 20. At this point, the air bag 9 is disposed between the lower fixed portion 3b of the fixed portion 3 and a lower part of the weight holder 4 that supports the built-in weight 5.

The numeral 21 designates a guide pin guide cylinder provided in the weight holder 4. The guide pin 8 vertically provided in the lower fixed portion 3b is inserted in the guide pin guide cylinder 21, and the weight holder 4 can be lifted and lowered along the guide pin 8.

In cases where the weighing instrument is in the normal weighing mode, the air bag 9 is filled with air unlike the first embodiment, the weight holder 4 is fixed to the lifted position (position illustrated in FIG. 5), and the load receiver 10 has no load of the built-in weight 5.

In cases where the calibration is performed using the built-in weight 5, the air is removed from the air bag 9 to gradually reduce the volume of the air bag 9. With decreasing volume of the air bag 9, the weight holder 4 on which the built-in weight 5 is placed falls by the self weights of the built-in weight 5 and weight holder 4, the built-in weight 5 is finally latched in the load receiver 10, and the measuring mechanism has the load of the built-in weight 5 with the load receiver 10 interposed therebetween, thereby performing the calibration. After the calibration, air is injected in the air bag 9 again, the built-in weight 5 latched in the load receiver 10 is latched by the weight holder 4 again and lifted to a predetermined position. Then, as with the first embodiment, the built-in weight 5 is fixed by the weight holder 4 and the fixed member, and the weighing apparatus enters the normal weighing mode.

In the second embodiment, the built-in weight lifting and lowering mechanism portion is hung and supported by the upper casing 20 of the weighing instrument. Alternatively, the built-in weight lifting and lowering mechanism portion may vertically be disposed on the lower casing side of the weighing instrument while the side of the lower fixed portion 3b is fixed to the lower casing side of the weighing instrument. On the contrary, in the first embodiment, obviously the built-in weight lifting and lowering mechanism portion may be hung on the upper casing side of the weighing instrument.

In the first and second embodiments, the pressurizing twin-motor is used as the driving mechanism in the air pump that supplies air to the air bag 9. Alternatively, reciprocating type air supply means in which a diaphragm is attached to a driving body that is reciprocated in response to an alternating-current frequency may be used, when the air supply and exhaust portion 2 is disposed while separated from the weighing mechanism portion of the weighing apparatus, or when the air supply and exhaust portion 2 is disposed outside the weighing apparatus. The reciprocating type air supply means is produced at extremely low cost, although the vibration is increased because of the reciprocating motion compared with the twin-motor of the embodiments. Therefore, when the reciprocating type air supply means is placed in a part on which the vibration has little influence in the weighing apparatus or outside the weighing apparatus, the trouble with the vibration can be avoided, and the weighing apparatus can be provided at lower cost.

In the first and second embodiments, the air bag is used as the driving container that imparts the lowering operation to the weight holder 4. Alternatively, an oil pump is placed in a part corresponding to the air supply and exhaust portion 2, and a fluid such as oil may be taken in and out between an oil tank placed on the oil pump side and a container corresponding to the air bag in order to vary the volume of the container. In such cases, because the container and the oil tank constitute a closed system, the built-in weight lifting and lowering device can be actuated without problems even in a special environment such as polluted air and reduced pressure.

FIGS. 6(A) and 6(B) illustrate a built-in weight lifting and lowering device according to a third embodiment of the invention. In the first and second embodiments, the increase and decrease in volume of the air bag 9 that is the driving container, in particular the increase and decrease in thickness in a direction perpendicular to the air bag 9 directly becomes an actuation distance in the operation for lifting and lowering the built-in weight 5. That is, the first and second embodiments provide the direct driving type built-in weight lifting and lowering device in which the air bag 9 is used. On the other hand, in an indirect driving type mechanism of the third embodiment, a lever mechanism is used as the conversion mechanism, and the air bag that drives a lever instead of a conventional cam is used as the driving mechanism.

Referring to FIGS. 6(A) and 6(B), in a level 30, while a fulcrum 31 is interposed between both ends, a weight holder 32 that is a built-in weight holding portion is formed as an action point at one end, and the air bag 9 is placed in a power point portion 33 at the other end. The weight holder 32 holds the built-in weight 5. In FIG. 6, the capacity of the air bag 9 becomes the maximum. At this point, the power point portion 33 is lowered while the weight holder 32 that is the action point is lifted in a Y-direction, and the built-in weight 5 is latched in the weight holder 32. Therefore, a load measuring mechanism portion 34 has no load of the built-in weight 5, and the electronic scale is in the normal load measuring mode.

In cases where the calibration is performed, air in the air bag 9 is emitted to reduce the volume of the air bag 9 by the method similar to that of the first or second embodiment. With decreasing volume of the air bag 9, in the lever 30, the weight holder 32 is lowered in an X-direction by the weight of the built-in weight 5, and the built-in weight 5 is finally placed on the load receiver portion 10 on the side of the load measuring mechanism 34 to perform the calibration. After the calibration, air is injected in the air bag 9 again, and the built-in weight 5 is fixed to the lifted position to return the electronic scale to the normal weighing mode.

Figure 7:
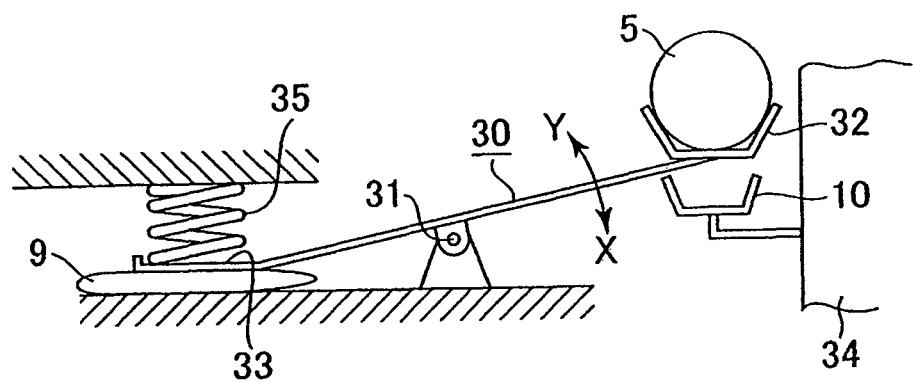
FIG. 7 is a side view illustrating a built-in weight lifting and lowering mechanism according to a fourth embodiment of the invention in which a lever mechanism is used.

FIG. 7 illustrates a built-in weight lifting and lowering device according to a fourth embodiment of the invention that is a modification of the third embodiment.

In FIG. 7, the numeral 35 designates a coil spring that is biased so as to vertically generate the repulsive force. The air bag 9 is disposed below the power point portion 33 of the lever 30.

When the electronic scale is in the weighing mode, the air bag 9 is exhausted to have the minimum capacity. The power point portion 33 is located in the lowermost part by the repulsive force of the coil spring 35, and therefore the weight holder 32 disposed at the other end of the lever 30 is located in the topmost position while holding the built-in weight 5.

In cases where the calibration is performed, air is injected in the air bag 9. Therefore, the power point portion 33 is lifted against the repulsive force of the coil spring 35 while the weight holder 32 is lowered in the X-direction, and the load receiver portion 10 finally has the load of the built-in weight 5 to perform the calibration. After the calibration, the air in the air bag 9 is exhausted, and the weight holder 32 holding the built-in weight 5 is lifted while the power point portion 33 is lowered again by the repulsive force of the coil spring 35, thereby returning the electronic scale to the normal weighing mode.

In the fourth embodiment, similarly the fluid (liquid) such as oil is used as an actuation medium instead of the air to form the closed system between the pump and the liquid tank, and the electronic scale can securely be actuated even in a special environment such as the polluted air and reduced pressure.

The built-in weight lifting and lowering device of the invention is placed in a relatively high-performance, high-resolution weighing apparatus such as the electromagnetic balancing type weighing apparatus by way of example. Further, the built-in weight lifting and lowering device of the invention can be placed in any weighing apparatus, such as an electronic scale in which a load cell is used and a capacitance type electronic scale, in which the calibration can electronically be performed.

The invention claimed is:

1. A built-in weight lifting and lowering device that adds and removes a load of a built-in weight to and from a load measuring mechanism of a weighing apparatus to perform calibration of the weighing apparatus and a normal weighing operation, comprising,
   a built-in weight latched in a weight holder, the weight holder being configured to be lifted and lowered with respect to a fixed portion, an elastic body interposed between the weight holder and a lower fixed portion of the fixed portion, a driving container disposed between the weight holder and an upper fixed portion of the fixed portion, a volume of the driving container being variable according to an interior content therein, the weight holder being lowered by an increase in volume of the driving container, and the weight holder being lifted by a repulsive force of the elastic body due to a decrease in volume of the driving container, whereby the load of the built-in weight is directly added to and removed from the load measuring mechanism by a change in volume of the driving container and the repulsive force of the elastic body.

2. The built-in weight lifting and lowering device according to claim 1, further comprising at least one pin interposed between the upper and lower fixed portions and along which the lifting and lowering of the built in weight is guided, and
   a coil spring received on at least one of the pins, the coil spring comprising the elastic body.

3. The built-in weight lifting and lowering device according to claim 1, wherein the driving container is formed as a bag into which a gas is supplied and from which the gas is discharged,
   the bag is connected to a gas supply and exhaust and a conduit for supplying the gas to and exhausting the gas from the bag, and
   the volume of the bag is increased and decreased by supplying and exhausting the gas to and from the bag.

4. The built-in weight lifting and lowering device according to claim 1, wherein a latch portion is formed in the upper fixed portion of the fixed portion, and
   the built-in weight is fixed by the upper fixed portion of the fixed portion and the weight holder when the weight holder latching the built-in weight is located in an uppermost part.

5. The built-in weight lifting and lowering device according to claim 3, wherein the air supply and exhaust conduit is formed independently of a built-in weight lifting and lowering mechanism, the built-in weight lifting and lowering mechanism comprising the air bag, the fixed portion, and the weight holder, and
   the independently-formed air supply and exhaust and the built-in weight lifting and lowering mechanism portion are connected by the conduit.

6. The built-in weight lifting and lowering device according to claim 1 wherein the driving container is configured to receive and discharge a liquid, the driving container is connected to a tank for the liquid through a pump for pumping liquid, and the liquid is moved between the driving container and the tank by the pump to increase and decrease the volume of the driving container.

7. The built-in weight lifting and lowering device according to any one of claim 1 or 2-6, wherein
   when the weight holder is lowered by an increase in volume of the driving container, the driving container is expanded so as to be disposed directly in contact with the weight holder and the upper fixed portion of the fixed portion so as to add the weight of the built-in weight to the load measuring mechanism in order to perform calibration of the weighing apparatus, and
   when the weight holder is lifted by a repulsive force of the elastic body due to a decrease in volume of the driving container, the driving container is contracted so as to be free from contact with the weight holder and upper fixed portion of the fixed portion so as to remove the weight of the built-in weight of the load measuring mechanism in order to allow performance of a normal weighing operation.

* * * * *